(12) United States Patent
Ming et al.

(10) Patent No.: US 8,671,537 B2
(45) Date of Patent: Mar. 18, 2014

(54) METHOD AND DEVICE FOR TREATMENT AND RECYCLING OF WASTE REFRIGERATORS

(76) Inventors: Guoying Ming, Changsha (CN); Yehua Liu, Changsha (CN); Yuping Zhang, Changsha (CN); Qilin Li, Changsha (CN); Peng Li, Changsha (CN)

( * ) Notice: Subject to any disclaimer, the term of this patent is extended or adjusted under 35 U.S.C. 154(b) by 173 days.

(21) Appl. No.: 13/424,363

(22) Filed: Mar. 19, 2012

(65) Prior Publication Data
US 2012/0174369 A1 Jul. 12, 2012

Related U.S. Application Data

(63) Continuation-in-part of application No. PCT/CN2010/001431, filed on Sep. 17, 2010.

(30) Foreign Application Priority Data

Sep. 25, 2009 (CN) .......................... 2009 1 0044409

(51) Int. Cl.
*B07B 13/00* (2006.01)

(52) U.S. Cl.
USPC ............. 29/403.1; 29/403.3; 29/771; 29/793; 29/791

(58) Field of Classification Search
USPC ........... 29/890.031, 403.1, 403.2, 403.3, 771, 29/193, 791
See application file for complete search history.

(56) References Cited

U.S. PATENT DOCUMENTS

| | | | | |
|---|---|---|---|---|
| 3,031,745 A * | 5/1962 | Dzialo | ........................ | 29/403.1 |
| 4,726,530 A * | 2/1988 | Miller et al. | .................... | 241/19 |
| 4,874,134 A * | 10/1989 | Wiens | .............................. | 241/19 |
| 5,071,075 A * | 12/1991 | Wiens | .............................. | 241/19 |
| 5,074,477 A * | 12/1991 | Welter et al. | .................... | 241/18 |
| 5,133,124 A * | 7/1992 | Burroughs | ................... | 29/403.1 |
| 5,251,824 A * | 10/1993 | Adelmann | ........................ | 241/3 |
| 5,829,692 A * | 11/1998 | Walters | .......................... | 241/62 |
| 6,024,226 A * | 2/2000 | Olivier | ....................... | 209/172.5 |
| 6,732,416 B1 * | 5/2004 | Jacobsen et al. | ............. | 29/403.3 |
| 6,974,097 B2 * | 12/2005 | Simon et al. | .................... | 241/19 |
| 7,162,785 B2 * | 1/2007 | Koumura et al. | ............ | 29/403.1 |
| 7,318,265 B2 * | 1/2008 | Takagi et al. | ................. | 29/403.1 |
| 2002/0153439 A1 * | 10/2002 | Yotsumoto et al. | ...... | 241/101.76 |
| 2004/0250399 A1 * | 12/2004 | Koumura et al. | ............. | 29/403.3 |
| 2006/0200964 A1 * | 9/2006 | Cameron et al. | ............ | 29/403.3 |
| 2007/0130742 A1 * | 6/2007 | Takagi et al. | ................ | 29/403.1 |
| 2008/0066282 A1 * | 3/2008 | Takagi et al. | ................ | 29/403.1 |

\* cited by examiner

*Primary Examiner* — David Bryant
*Assistant Examiner* — Justin Sikorski
(74) *Attorney, Agent, or Firm* — Matthias Scholl P.C.; Matthias Scholl

(57) ABSTRACT

A method and device for harmless treatment and recycling of waste refrigerators. Plastic parts, electrical boxes, compressors, and condensers are disassembled at a disassembling station. Refrigerants from compressors are recycled at a fluoride-extracting station. Refrigerator bodies and doors are transferred to a double shaft shredder and a rolling crusher for crushing. Crushed materials are sorted out by wind force, by a self-discharge type iron remover made of permanent magnet and a cylindrical iron remover for magnetic separation. The device is placed in an enclosed workshop equipped with a multistage ventilation system, a protective device of nitrogen, a device for spraying, dedusting, and cooling, and an on-line detection and alarm control device for cyclopentane gas concentration, polyurethane dust concentration, and temperature. The method and device have low manufacturing and operating costs and are dustproof, explosion proof, environmentally friendly and has excellent recycling effects.

10 Claims, 11 Drawing Sheets

| No. | Materials | Proportion (weight) % | Fineness (mm) |
|---|---|---|---|
| 1 | Iron and copper | 64 | 20X20X20-60X60X60 |
| 2 | Copper and aluminum | 3.5 | Φ10X40-Φ10 X100 or 40X40X1-100X40X1 |
| 3 | Plastics (ABS, PVC, PP and AS) | 15 | 20X20X2 - 100X100X2 |
| 4 | Thermal polyurethane foam | 13.5 | Φ1-Φ30 |
| 5 | Others (e.g. refrigerant, refrigerator oil, glass shelves, glass doors and circuit boards) | 4 | The refrigerant and refrigerator oil are separately sucked and stored in dedicated tanks; glass shelves, glass doors and circuit boards are disassembled from the front end as a whole. |

FIG. 11

METHOD AND DEVICE FOR TREATMENT AND RECYCLING OF WASTE REFRIGERATORS

CROSS-REFERENCE TO RELATED APPLICATIONS

This application is a continuation-in-part of International Patent Application No. PCT/CN2010/001431 with an international filing date of Sep. 17, 2010, designating the United States, now pending, and further claims priority benefits to Chinese Patent Application No. 200910044409.2 filed Sep. 25, 2009. The contents of all of the aforementioned applications, including any intervening amendments thereto, are incorporated herein by reference.

BACKGROUND OF THE INVENTION

1. Field of the Invention

The invention relates to a method and device for environmental protection, and more particularly to a method and device for treatment and high-efficiency recycling of waste refrigerators.

2. Description of the Related Art

Conventional waste refrigerators are disposed with the following two main channels: 1. waste refrigerators are refurbished for low-income or rural families, which poses a potential hazard for environmental pollution; and 2. waste refrigerators are manually disassembled in small workshops with poor conditions. After useful resources are recovered, a great deal of poisonous and harmful substances are dumped to rivers, buried under the ground or burned to the atmosphere, leading to huge resource waste and heavy environmental pollution.

SUMMARY OF THE INVENTION

In view of the above-described problems, it is one objective of the invention to provide a method and device for harmless treatment and high-efficiency recycling of waste refrigerators. The device has low manufacturing and operating costs and can be manufactured and operated easily without the problems of leakage or production of waste gas, waste water, waste residue, and secondary pollution and moreover it is dustproof, explosion proof, environmental friendly and has excellent recycling effects.

To achieve the above objective, in accordance with one embodiment of the invention, there provided is a method for harmless treatment and high-efficiency recycling of waste refrigerators, the method comprising the steps of:

1) Placing a feeding device, a double shaft shredder equipped with a pressing device, a first belt conveyor, a rolling crusher, a second belt conveyor, a first vibratory feeder, a cylindrical iron remover, a second vibratory feeder, and an eddy current sorter in an enclosed workshop, equipping the workshop with a multistage ventilation system, a protective device of nitrogen, a device for spraying, dedusting, and cooling, an on-line detection and alarm control device for cyclopentane gas concentration, polyurethane dust concentration, and temperature, safety devices for static grounding, main circuit switching control, emergency stop control, alarm and status display, and air vent monitoring;
2) Manually disassembling waste refrigerators at a disassembling station in the front of a production line to recover their components: plastic parts, electrical boxes, wires, glasses, and circuit boards;
3) Recycling refrigerants from compressors using a machine for refrigerant recovery at a fluoride-extracting station in the middle of the production line;
4) Manually disassembling the compressors and condensers that are not easily to be crushed by a crusher at a disassembling station in the rear of the production line;
5) Transferring refrigerator bodies and doors to the double shaft shredder equipped with a pressing device via the feeding device for preliminary crushing, and transferring crushed materials using the first belt conveyor to the rolling crusher for secondary crushing, or directly transferring the refrigerator bodies and doors to a mixing crusher for crushing via the feeding device so that metals, plastics, and foams are completely dissociated for further separation and sorting;
6) Sorting out the crushed materials by wind force, collecting polyurethane foams using the cyclone collector, and discharging waste gases;
7) Transferring remaining materials via the second belt conveyor and separating black metallic iron using a self-discharge type iron remover made of permanent magnet;
8) Leading the materials to the cylindrical iron remover via the second belt conveyor and the first vibratory feeder in a continuous and even manner for magnetic separation of remaining iron, and collecting the iron into a skip via a hopper of the cylindrical iron remover; and
9) Collecting remaining materials into the second vibratory feeder via another hopper of the cylindrical iron remover, transferring the materials via the second vibratory feeder to the eddy current sorter in a continuous and even manner for separation of non-ferrous metals comprising cooper, aluminum, plastics, and thick polyurethane foam, and collecting the cooper, aluminum, plastics, and thick polyurethane foam into different skips.

By the method, more than 95% materials can be recycled.

In accordance with another embodiment of the invention, there provided is a device of a production line for harmless treatment and high-efficiency recycling of waste refrigerators, comprising in sequence:

a manual disassembly station;
a device for refrigerant recycling;
a feeding device;
a double shaft shredder equipped with a pressing device;
a first belt conveyor;
a rolling crusher;
a second belt conveyor;
a first vibratory feeder;
a cylindrical iron remover;
a second vibratory feeder; and
an eddy current sorter;

wherein a cyclone collector, a dust catcher, and a fan are mounted at the area of the rolling crusher or the mixing crusher; an input pipe of the cyclone collector is connected with flanges arranged on the top and the top of feed openings of either the rolling crusher or the mixing crusher; an input pipe of the dust catcher is connected with an output pipe of the cyclone collector; a self-discharge type iron remover made of permanent magnet is mounted closely on the second belt conveyor; and devices from the feeding device to the eddy current sorter are all placed in an enclosed workshop with explosion-proof and dust removal functions.

In a class of this embodiment, the double shaft shredder, the first belt conveyor, and the rolling crusher as a whole is replaced by a mixing crusher, and the cyclone collector, the dust catcher, and the fan are mounted at the area of the mixing crusher.

In a class of this embodiment, the structure of the double shaft shredder with a pressing device is as follows: 2 hexagonal rotation axes and shredding knives mounted thereon which are separately driven by 2 high-power motors are mounted inside a shredding chamber on a frame of the double shaft shredder, a feeding hopper is mounted above the shredding chamber, the top of the feeding hopper is coupled to an outlet for negative pressure dust and the pressing device is mounted on the frame at the rear of the feeding hopper; the feeding device has the following structure: a hopper is mounted at one side of the frame of the double shaft shredder, one end of an arm of the hopper is coupled to the frame of the double shaft shredder through a rotation axis, a central section of the arm of the hopper is connected with a rod of a hydraulic piston, and one end of the hydraulic cylinder is coupled to the frame of the double shaft shredder.

In a class of this embodiment, the structure of the rolling crusher is as follows: a motor, a driving belt, and a rotation axis are mounted under a frame of the rolling crusher, the frame is provided with a crushing chamber and a discharge chamber, the discharge chamber is under and communicates with the crushing chamber, stationary knives fixed by bolts are mounted at side walls of the crushing chamber, the rotation axis inside the crushing chamber is mounted with a cutting knife holder and a roller holder, in which the cutting knife holder is mounted with cutting knives and the roller holder is mounted with a rotary roller with teeth through an axis pin; the discharge chamber is under the crushing chamber, a discharge plate is mounted on the discharge chamber and fixed on the rotation axis, the top of the crushing chamber is coupled to a feeding hopper and the top of the feeding hopper is coupled to an outlet for negative pressure dust.

In a class of this embodiment, the structure of the mixing crusher is as follows: a motor, a driving belt, and a rotation axis are mounted under a frame of the mixing crusher, a crushing chamber and a discharge chamber are mounted on the frame, the crushing chamber is mounted with stationary knives, the rotation axis inside the crushing chamber is mounted with a cutting knife holder and the cutting knife holder is mounted with cutting knives, the rotation axis is mounted with a rotary roller with teeth through a roller holder and an axis pin, the discharge chamber is under the crushing chamber, a discharge plate is mounted on the discharge chamber; a shredding chamber is provided above the crushing chamber, 2 hexagonal rotation axes and shredding knives mounted thereon separately driven by 2 high-power motors are mounted inside the shredding chamber, a feeding hopper is mounted on the top of the shredding chamber and the top of the feeding hopper is coupled to an outlet for negative pressure dust.

In a class of this embodiment, the structure of the cylindrical iron remover is as follows: a stainless roller is mounted inside a frame of the cylindrical iron remover, an arc-shaped permanent magnetic material, with length less than half side of an inner wall of the stainless roller, is mounted on the inner wall of the stainless roller, the feed side of the stainless roller is mounted along the tangent line of the top of the stainless roller, and a non-magnetic material outlet and a magnetic material outlet are respectively arranged at the front and back of the frame bottom.

In a class of this embodiment, the structure of the eddy current sorter is as follows: a first motor and a permanent magnetic roller driven by the first motor for speedy rotation are mounted on a frame of the eddy current sorter, a second motor as well as a belt roller and a conveyor belt driven by the second motor are also mounted on the frame, the conveyor belt is positioned above the permanent magnetic roller and a non-ferrous metal outlet and a non-metallic materials outlet are respectively arranged at the front and back of the frame under the end of the conveyor belt.

Advantages of the invention are summarized below:
(1) A scientific, reasonable, and standard recycling procedure has been established. When a non-leakage device for recycling refrigerants having self-cleaning function is applied to extract Freon and to recover different components of waste refrigerators under automatic and semiautomatic methods, the resource recycling rate can exceed 95% and no secondary pollution occurs.
(2) Compared with low-temperature crushing method under liquid nitrogen adopted by foreign countries, the room-temperature crushing method requires lower investment, lower operating costs and simpler operating procedure.
(3) Physical method is adopted in the invention to recover waste refrigerators without producing waste gas, waste water, and waste residue.
(4) It is suitable for the actual conditions of China, i.e. a rich source of labor; the device has lower manufacturing costs and it can be simply manufactured and easily operated.
(5) It is suitable for the economic development of China, i.e. to exchange old household appliances for new ones to promote domestic demand, and the invention provides a new method and a new device for environmentally friendly treatment of waste household appliances.
(6) An enclosed workshop is used, which is provided with a series of safety measures for ventilation, spraying, dedusting, nitrogen filling, static grounding, main circuit switching control, emergency stop control, alarm and status display as well as air vent monitoring. It solves the dustproof and explosion proof problems for treatment of waste refrigerators and household appliances domestically and internationally and it is safe and environmental friendly.
(7) Please refer to FIG. 9 for material proportion and detailed data on fineness after treatment of waste refrigerators.

BRIEF DESCRIPTION OF THE DRAWINGS

FIG. 11 is a table of material proportion and fineness after treatment of waste refrigerators.

DETAILED DESCRIPTION OF THE EMBODIMENTS

Figure 1:
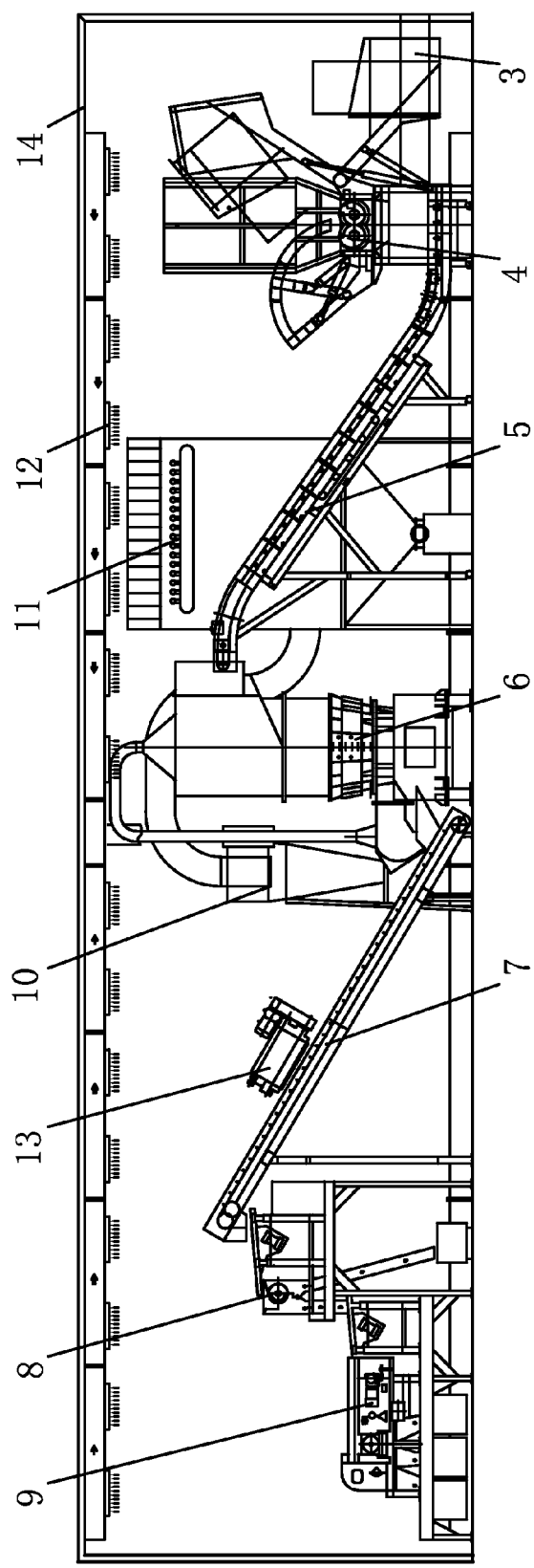
FIG. 1 is a structural representation of a production line device in accordance with one embodiment of the invention.
Figure 2:
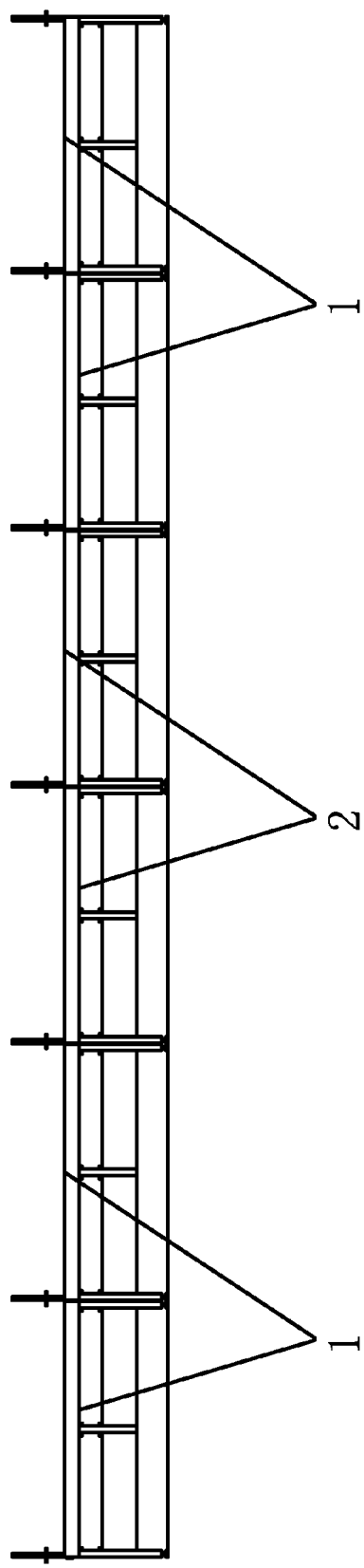
FIG. 2 is a structural representation of a manual disassembly station in accordance with one embodiment of the invention.
Figure 3:
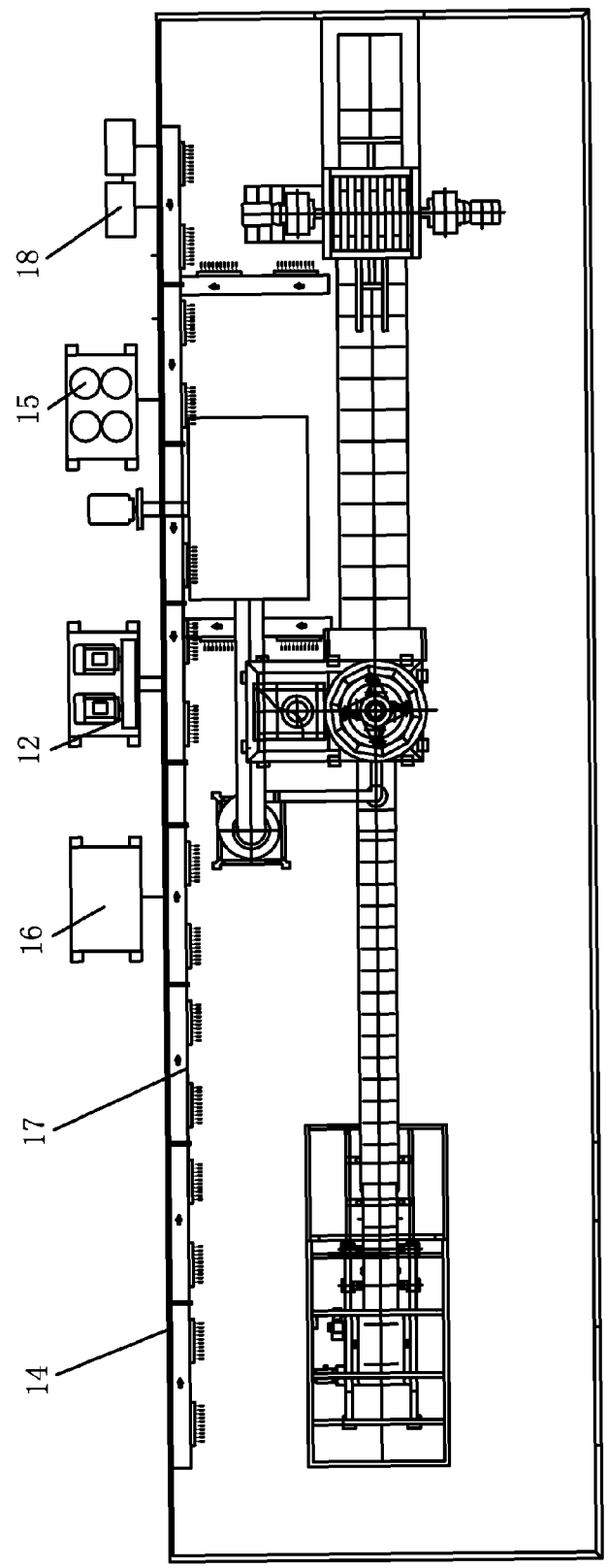
FIG. 3 is a top view of FIG. 1.
Figure 4:
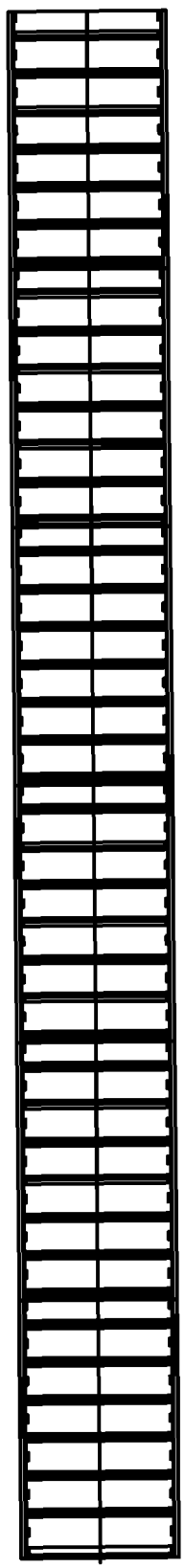
FIG. 4 is a top view of FIG. 2.

As shown in FIGS. 1-4, a device for harmless treatment and high-efficiency recycling of waste refrigerators, in accordance with the invention, comprises in sequence a manual disassembly station 1, a device for refrigerant recycling 2, a feeding device 3, a double shaft shredder 4 equipped with a pressing device, a first belt conveyor 5, a rolling crusher 6, a second belt conveyor 7, a first vibratory feeder, a cylindrical iron remover 8, a second vibratory feeder, and an eddy current sorter 9. The double shaft shredder, the first belt conveyor, and the rolling crusher as a whole can be replaced by a mixing crusher. A cyclone collector 10, a dust catcher 11, and a fan 12 are mounted at the area of the rolling crusher or the mixing crusher. An input pipe of the cyclone collector is connected with flanges arranged on the top and the top of the feed opening of either the rolling crusher or the mixing crusher. An input pipe of the dust catcher is connected with an output pipe of the cyclone collector. A self-discharge type iron remover 13 made of permanent magnet is mounted closely on the second belt conveyor. Devices from the feeding device to the eddy current sorter are all placed in an enclosed workshop 14 with explosion-proof and dust removal functions.

A method for harmless treatment and high-efficiency recycling of waste refrigerators comprises the steps of: manually disassembling waste refrigerators at a disassembling station in the front of a production line to recover their components comprising plastic parts (e.g. top covers, drawers, shelves, etc.), wires, glasses, and circuit boards, then recycling refrigerants from the compressors at a fluoride extracting station, and finally manually disassembling the compressors and condensers that are not easily to be crushed by the crusher at a disassembling station in the rear of the production line. After that, highly purified iron, copper, aluminum, and plastics are obtained. The refrigerator bodies and doors (they cannot be separated manually as they are composed of color steel plates, plastic inner liners, polyurethane insulation layer, and several condenser tubes as a whole) are first transferred to the double shaft shredder via the feeding device for preliminary crushing into long strip-type materials with the dimensions of 200-600 mm (length)×40 mm (width)×40 mm (thickness), then the above crushed materials is automatically transferred to the rolling crusher via the first belt conveyor for secondary crushing. After that, iron, copper, aluminum, plastics, and polyurethane foam are completely dissociated. These materials are sorted out by wind force. The cyclone collector collects polyurethane foam with a small particle diameter and waste gases are discharged after being dedusted by the dust catcher and the rest of the materials drop on the second belt conveyor. When the materials pass through the self-discharge type iron remover made of permanent magnet during the automatic transfer, the large black metallic iron is separated and the remaining materials are further carried to the first vibratory feeder via the second belt conveyor. The first vibratory feeder transfers the materials to the cylindrical iron remover in a continuous and even manner. The cylindrical iron remover finally separates all the remaining small iron, which is to drop in a skip. The rest of the materials drop in the second vibratory feeder from another hopper of the cylindrical iron remover. After the materials are transferred to the eddy current sorter via the second vibratory feeder in a continuous and even manner, valuable non-ferrous metal such as cooper and aluminum as well as plastics and thick polyurethane foam are separated and drop in different skips. After the above procedures, more than 95% of the waste refrigerators are recycled.

Apart from manual disassembly, the other procedures are carried out by a combination of the automatic and manual operations, coupled with a multistage ventilation system 17 (for safety production, startup is divided into different stages, flammable and explosive cyclopentane gases are diluted by large wind force, and ventilation is provided); a protective device of nitrogen 15 (for nitrogen protection in the secondary crushing area and dedusting area with oxygen content (volume concentration) controlled below 8% and for secondary protection in case of emergency); a device for spraying, dedusting, and cooling 16; an on-line detection and alarm control device for cyclopentane gas concentration, polyurethane dust concentration, and temperature; main circuit switching control; emergency stop buttons provided at several positions; alarm and status display; and air vent monitoring. All the devices are provided with reliable anti-static grounding cables to ensure safety production.

Figure 5:
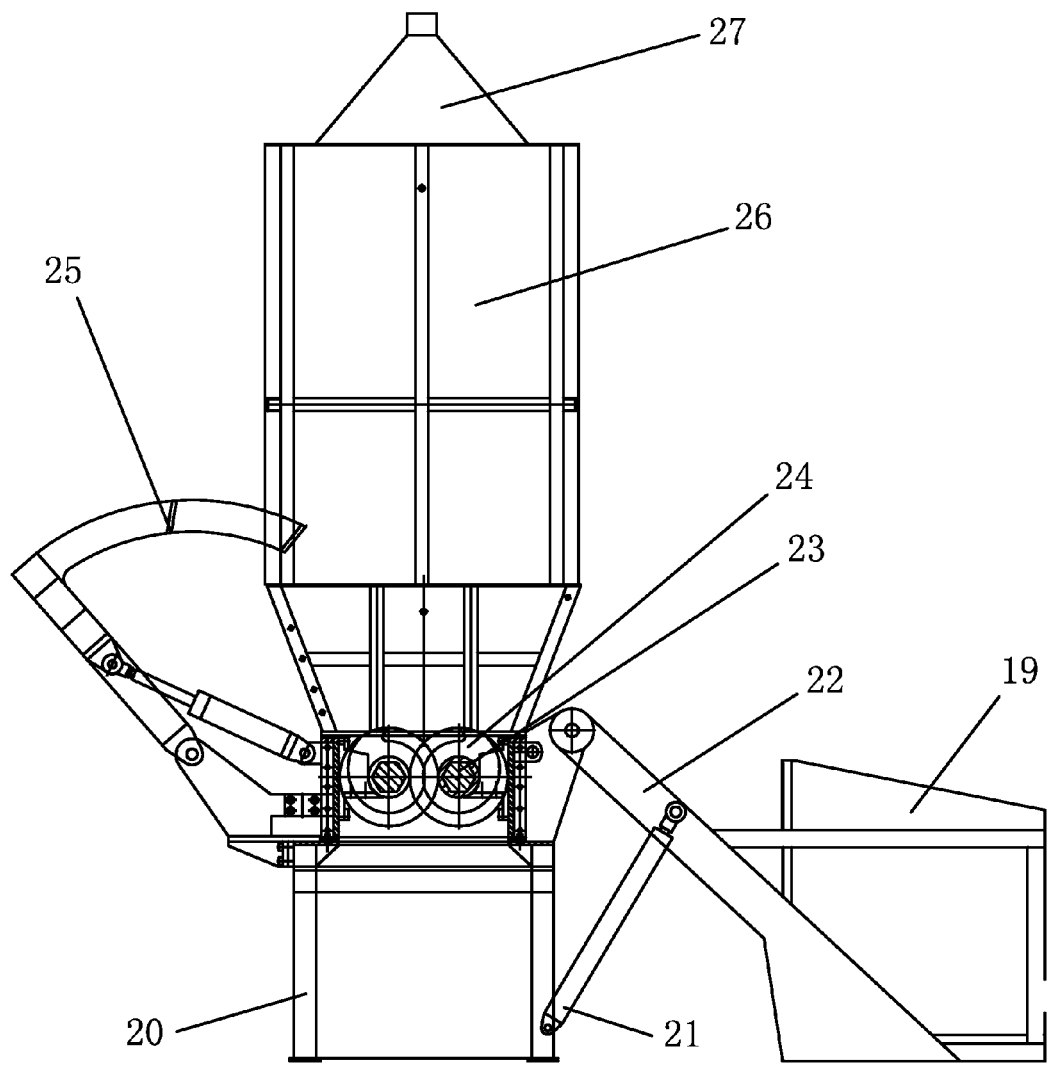
FIG. 5 is a structural representation of a double shaft shredder in accordance with one embodiment of the invention.

As shown in FIG. 5, the structure of the feeding device is as follows: the feeding hopper 19 is mounted at one side of the frame 20 of the double shaft shredder, one end of a feeding hopper 19 arm is coupled to the frame of the double shaft shredder through the rotation axis, the central section of the feeding hopper arm 22 is connected with a rod of a hydraulic piston 21 and one end of the hydraulic cylinder is coupled to the frame of the double shaft shredder.

The structure of the double shaft shredder is as follows: 2 wide-angle powerful hexagonal rotation axes 23 and shredding knives 24 mounted thereon separately driven by 2 high-power motors are mounted inside a shredding chamber on the frame, a feeding hopper 26 is mounted above the shredding chamber, the top of the feeding hopper is coupled to an outlet 27 for negative pressure dust and a pressing device 25 is mounted on the frame at the rear of the feeding hopper 26.

The operating principles and advantages of the double shaft shredder are summarized below: after waste refrigerators are moved to the feeding hopper via the feeding device, 2 high-power motors drive 2 wide-angle powerful hexagonal rotation axes to rotate in opposite directions. The shredding knives mounted on the rotation axes begin to shred the refrigerators with large torque. The shredded materials are long strip-type with the dimensions of 200-600 mm (length)×40 mm (width)×40 mm (thickness). Such a shredding method features large torque, low energy consumption, low noise, and low dust and is especially suitable for extra large and extra thick materials.

Figure 6:
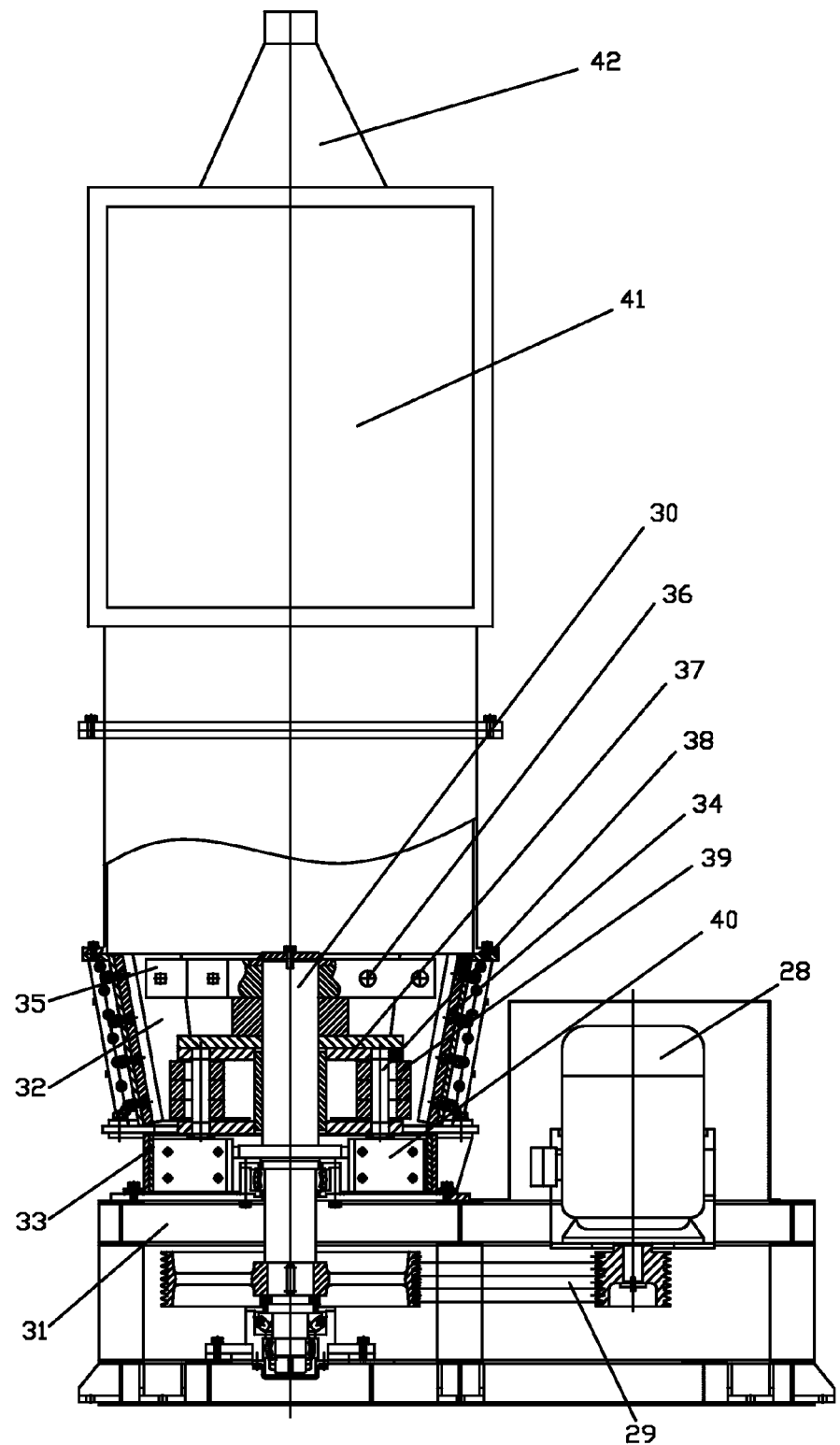
FIG. 6 is a structural representation of a rolling crusher in accordance with one embodiment of the invention.

As shown in FIG. 6, the structure of the rolling crusher is as follows: a motor 28, a driving belt 29, and a rotation axis 30 are mounted under the frame 31 of the rolling crusher. The frame comprises a crushing chamber 32 and a discharge chamber 33, stationary knives 34 are mounted on the crushing chamber wall, the rotation axis 30 inside the crushing chamber is mounted with cutting knives 36 via a cutting knife holder 35, the rotation axis 30 is mounted with a rotary roller 39 via a roller support 37 and an axis pin 38, the discharge chamber 33 is under the crushing chamber 32, a discharge plate 40 is mounted on the discharge chamber, the top of the crushing chamber is coupled to the feeding hopper 41 and the top of the feeding hopper 41 is coupled to an outlet 42 for negative pressure dust.

The operating principles of the rolling crusher are summarized below: after mixed materials are transferred to the feeding hopper via the first belt conveyor, the motor drives the rotation axis to rotate via the pulley, the cutting knives mounted on the rotation axis and the stationary knives mounted on the crushing chamber wall first cut the materials and then the materials move downwards. A big gap is arranged between the rotary roller mounted on the roller support and the axis pin. When the roller support rotates around the rotation axis, the rotary roller, on the one hand, rotates around the rotation axis, and on the other hand, rotates on it own around the axis pin under the centrifugal force, therefore, the gap between the rotary roller and the stationary knives mounted on the crushing chamber wall is sometimes big and sometimes small. Consequently, when materials pass through the gap, they will be impacted, cut, pressed, bended by the rotary roller and the stationary knives, different types of materials are to be separated and rolled and finally discharged by the discharge plate. Meanwhile, a fan is used to collect dust produced during the crushing process at the outlet for negative pressure dust and then the dust will be filtered and discharged without affecting the environment.

The characteristics of the rolling crusher are that it is suitable for crushing and separation of thin and less strong metallic materials such as automobile cases, refrigerator cases, computer cases, etc.

Figure 7:
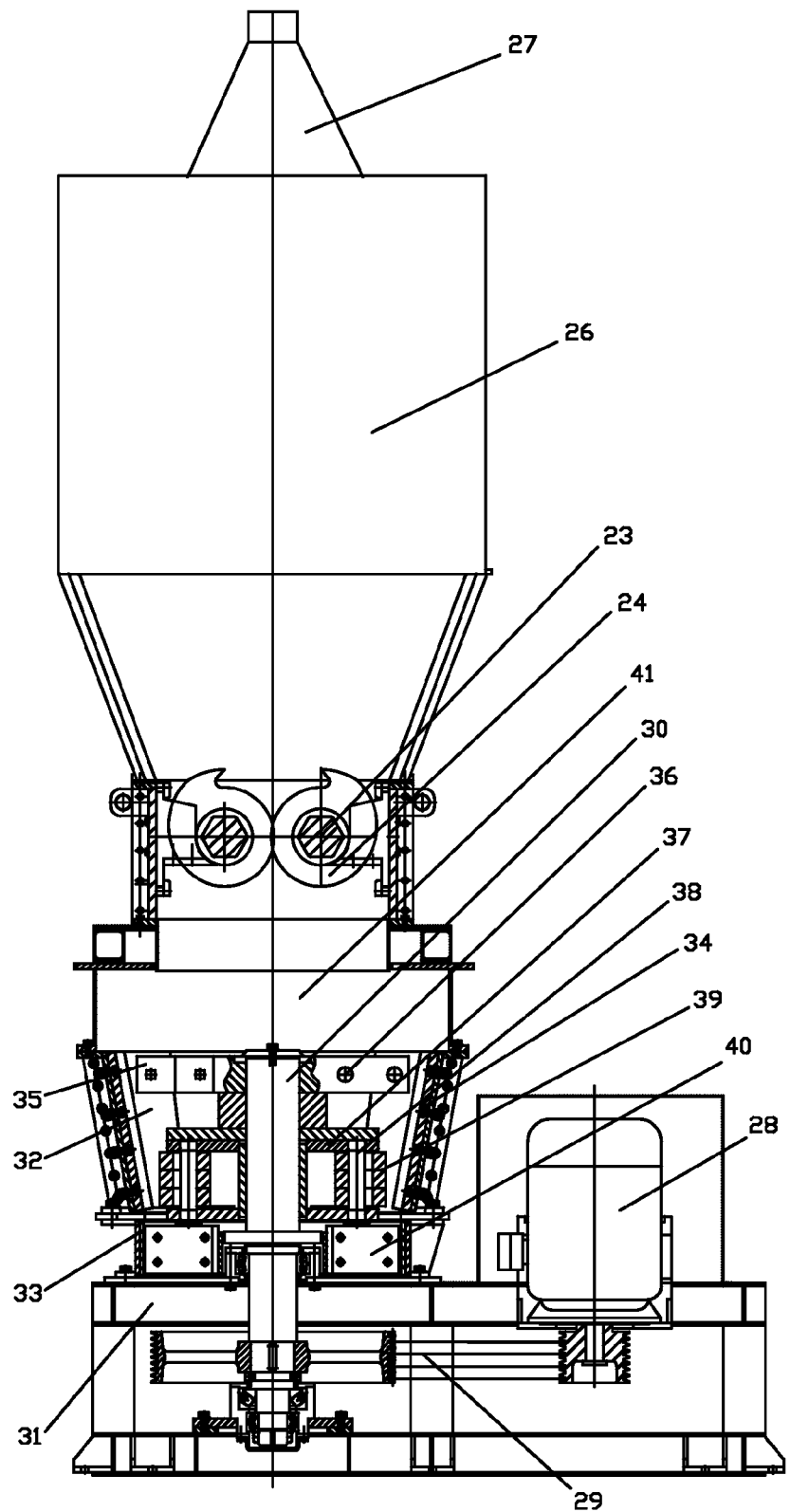
FIG. 7 is a structural representation of a mixing crusher in accordance with one embodiment of the invention.

As shown in FIG. 7, the structure of the mixing crusher is as follows: a motor 28, a driving belt 29, and a rotation axis 30 are mounted under the frame 31 of the mixing crusher, a crushing chamber 32 and a discharge chamber 33 are mounted on the frame, the crushing chamber is mounted with stationary knives 34, the rotation axis inside the crushing chamber is mounted with cutting knives 36 via a cutting knife holder 35, the rotation axis 30 is mounted with a rotary roller 39 through a roller support 37 and an axis pin 38, the discharge chamber 33 is under the crushing chamber 32, a discharge plate 40 is mounted on the discharge chamber; the top of the crushing chamber 32 is coupled to the shredding chamber 41, the 2 high-power motors mounted inside the shredding chamber drive the 2 wide-angle powerful hexagonal rotation axes and shredding knives 24 mounted thereon to rotate, a feeding hopper 26 is mounted on the top of the shredding chamber and the top of the feeding hopper is coupled to an outlet 27 for negative pressure dust.

When different types of materials are transferred to the crushing chamber 32 via the belt conveyor, they are firstly shredded by the shredding knives (rotate in opposite directions) driven by the wide-angle powerful hexagonal rotation axes into long strip-type materials with the dimensions of 400-600 mm (length)×40 mm (width)×40 mm (thickness), the shredded materials drop in the crushing chamber 32 and then impacted, cut, pressed, bended by the rotary roller, therefore different types of materials are to be separated and moved to the discharge outlet by the discharge plate. In the whole shredding process, dust and harmful or explosive gases are collected under negative pressure and nitrogen gas is used for protection.

The mixing crusher has two crushing methods for coarse crushing and fine crushing, having the advantages of small floor area occupied, low investment, and low dust emission and meanwhile the machine is easy to provide dust removal and explosion protection during the crushing process.

The operating principles and advantages of the crushing method (preliminary crushing) of the double shaft shredder: 2 motors drive 2 wide-angle powerful hexagonal rotation axes to rotate in opposite directions; the shredding knives mounted on the rotation axes begin to shred the materials with large torque. Such shredding method featuring large torque, low energy consumption, low noise and low dust is especially suitable for extra large and extra thick materials.

The operating principles of the crushing method (secondary crushing) of the rotary roller: the motor drives the rotation axis to rotate via the belt conveyor, the cutting knives mounted on the rotation axis and the stationary knives mounted on the crushing chamber wall firstly cut the materials and then the materials move downwards. A big gap is arranged between the rotary roller mounted on the roller support and the axis pin. When the roller support rotates around the rotation axis, the rotary roller, on the one hand, rotates around the rotation axis, and on the other hand, rotates on it own around the axis pin under the centrifugal force, therefore, the gap between the rotary roller and the stationary knives mounted on the crushing chamber wall is sometimes big and sometimes small. Consequently, when materials pass through the gap, they will be impacted, cut, pressed, bended by the rotary roller and the stationary knives, different types of materials are to be separated and rolled and finally discharged by the discharge plate. Meanwhile, a fan is used to collect dust produced during the crushing process at the outlet for negative pressure dust and then the dust will be filtered and discharged without affecting the environment.

Figure 8:
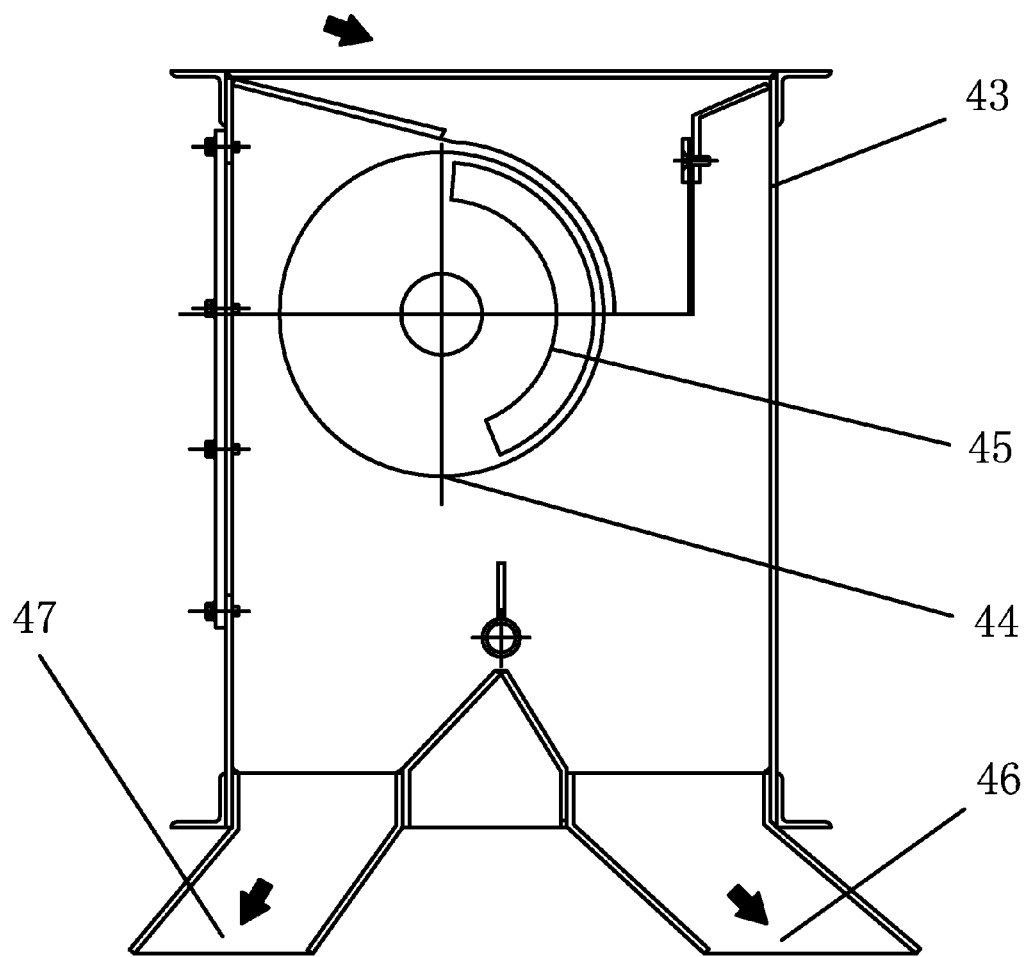
FIG. 8 is a structural representation of a cylindrical iron remover in accordance with one embodiment of the invention.

As shown in FIG. 8, the structure of the cylindrical iron remover is as follows: a stainless roller 44 is mounted inside the frame 43 of the cylindrical iron remover, an arc-shaped permanent magnetic material 45, with length less than half side of an inner wall of the stainless roller, is mounted on the inner wall of the stainless roller, the feeding side of the stainless roller is mounted along the tangent line of the stainless roller top, and a non-magnetic material outlet 46 and a magnetic material outlet 47 are respectively arranged at the front and back of the frame bottom.

The operating principles of the cylindrical iron remover: when the materials pass through the cylindrical iron remover, the iron and ferric oxide are sucked on the surface of the stainless roller under the magnetic field force of the permanent magnetic material and rotate clockwise along the roller. When they are rotated to the area without the magnetic field force, they will fall off from the surface of the stainless roller under the action of gravity and drop to the skip from the magnetic material outlet and the rest of the non-magnetic materials will be directly discharged from the non-magnetic material outlet only under the action of gravity, therefore, the iron is automatically removed from the materials. The whole process is conducted in a continuous manner and the system is stable and reliable.

Figure 9:
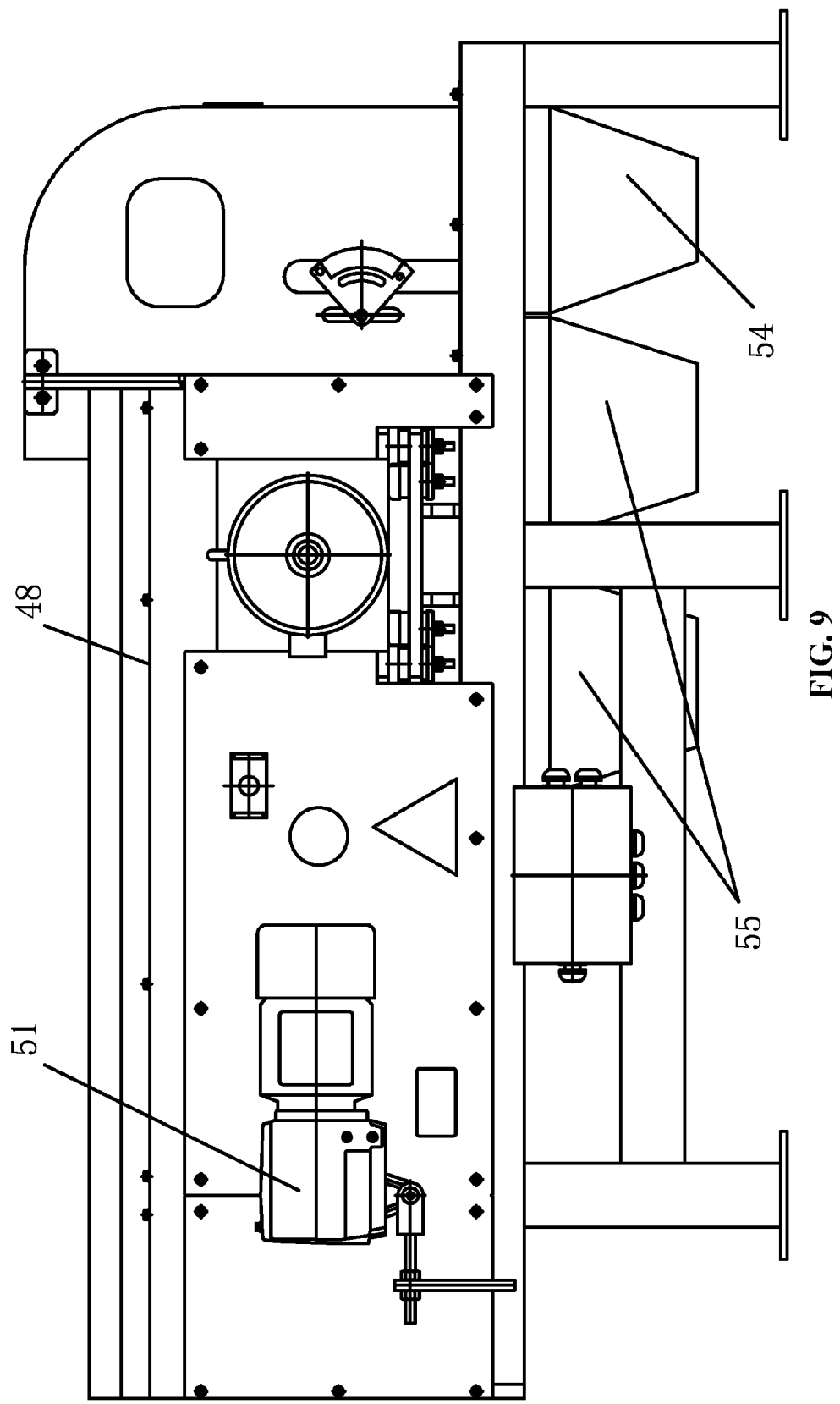
FIG. 9 is a structural representation of an eddy current sorter in accordance with one embodiment of the invention.
Figure 10:
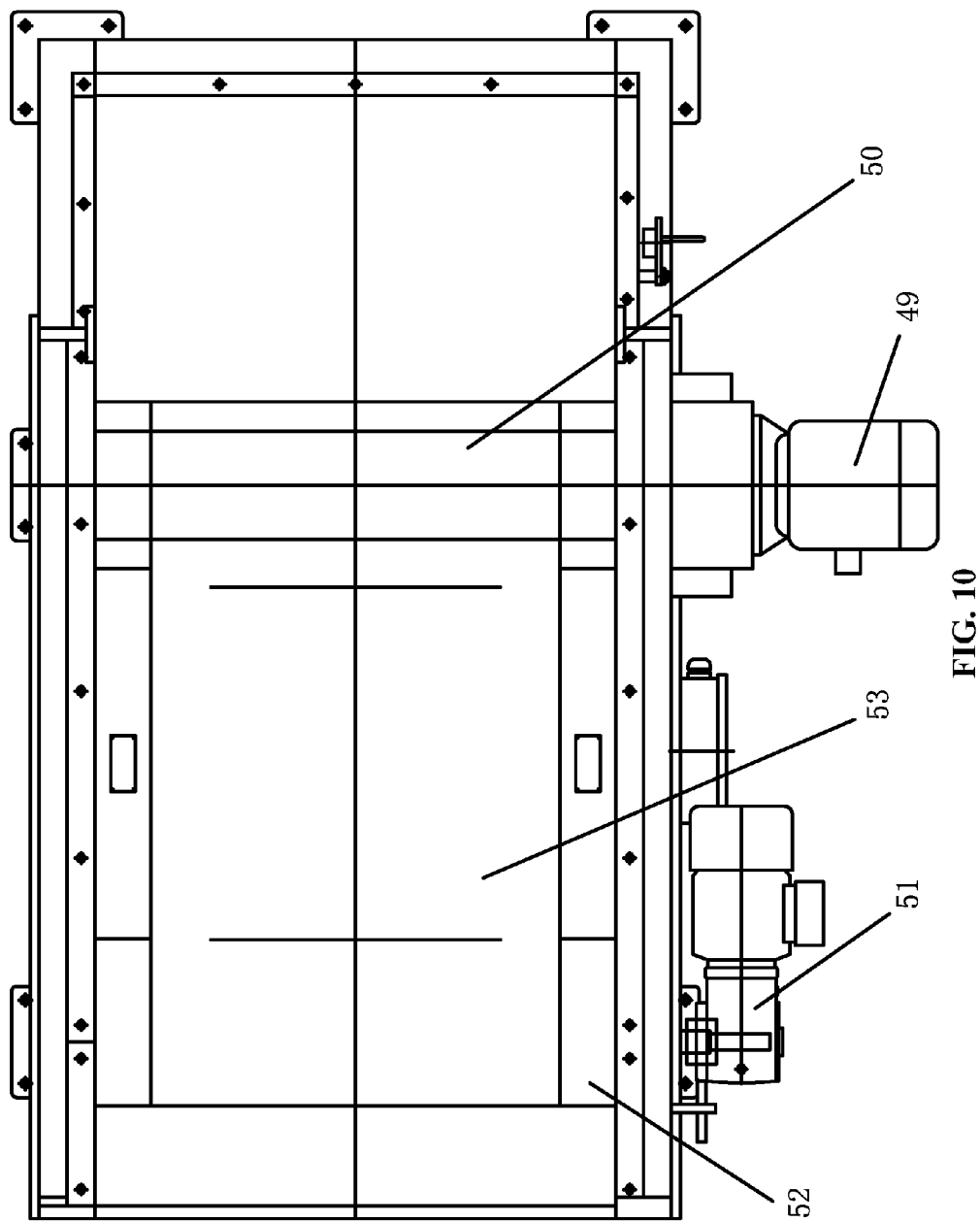
FIG. 10 is a top view of FIG. 9.

As shown in FIGS. 9 and 10, the structure of the eddy current sorter is as follows: a first motor 49 and a powerful permanent magnetic roller 50 driven by the first motor for speedy rotation are mounted on the frame 48 the eddy current sorter, a second motor 51 as well as a belt roller 52 and a conveyor belt 53 driven by the second motor are also mounted on the frame, the conveyor belt is positioned above the powerful permanent magnetic roller 50 and a non-ferrous metal outlet 54 and a non-metallic materials outlet 55 are respectively arranged at the front and back of the frame under the conveyor belt end.

The eddy current sorter uses different electrical conductivity of materials for separation and its working principle is that it uses the motor to drive the powerful permanent magnetic roller to rotate at a high speed to produce an alternately changing magnetic field. When the non-ferrous metal having conductivity performance is transferred to the powerful permanent magnetic roller via the belt conveyor driven by the motor, an eddy current will be induced within the non-ferrous metal. Such eddy current itself may produce the alternately changing magnetic field, which is opposite to the magnetic field produced by the powerful permanent magnetic roller; therefore, the non-ferrous metal will jump out from its conveying direction under the repulsion effects and be discharged from its outlet. The remaining non-metallic materials on the conveyor belt drop from the belt end and are discharged from the corresponding outlet, thus they are separated from the other non-metallic materials such as glasses and plastics and the purpose of separation is achieved.

The safety system of the invention comprises the following devices:

1. The production line is arranged with an independent electrical cabinet 18; a double shaft shredder; a rolling crusher; an on-line detection and alarm control device for cyclopentane gas concentration, polyurethane dust concentration and temperature; a device for spraying and dedusting; auto-nitrogen gas protection; ventilation control system; emergency stop control; main circuit switching control; alarm and status display, and air vent monitoring.

2. Lightning rods and grounding cables are arranged at the isobutane/cyclopentane discharge outlets and outdoor outlets in the waste refrigerator storage area so as to prevent thunder, lightning waves, and lightning induction.

3. An auto fire alarm system and an auto sprinkler system are arranged in refrigerator disassembly and treatment workshops.

4. All devices for treatment of waste refrigerators are reliably grounded to prevent static electricity.

Safety control methods and principles are summarized below:

1. To avoid explosion in waste refrigerator treatment area due to the leakage and accumulation of cyclopentane gas, isobutane gas and polyurethane foam, all devices, except the manually disassembled parts, used in the invention are placed in an enclosed workshop, which is equipped with a ventilation system and a device for air pressure/flow rate monitoring; the cyclopentane gas, isobutane gas and polyurethane foam are to be diluted by the ventilation system to ensure their volume concentration in the air is lower than the explosion limit (40%). Meanwhile, the ventilation system is arranged with an independent emergency power supply having a dual power supply switching box and an end switching device, so that the ventilation system can still function in case of the normal power supply system fault.

2. Since waste refrigerators produce large amount of dust during the crushing period and the vesicant cyclopentane may spill when Freon-free refrigerators are crushed. For the purpose of safety control, a continuous monitoring of cyclopentane gas concentration, polyurethane dust concentration and temperature are carried out in the area of the double shaft shredder, rolling crusher and dust catcher and a multistage alarm system is installed for the second-level alarm and the first-level alarm. Meanwhile, nitrogen gas is used for protection during the crushing, transferring and dedusting processes in the area of the double shaft shredder, rolling crusher and dust catcher and the oxygen content (volume concentration) shall be controlled below 8%.

3. To reduce the polyurethane foam concentration during the shredding, fine crushing, and transferring processes of waste refrigerators, a spraying and deducting device is designed to continuously spray to the double shaft shredder, rolling crusher, and conveyer belt during the operation.

4. When the system receives the first-level alarm sent by the cyclopentane gas probe or the polyurethane dust probe in the area of the double shaft shredder, rolling crusher, and dust catcher, it will immediately open the related nitrogen gas control valve and meanwhile spray nitrogen gas again in the related area.

5. Emergency stop buttons are arranged in several treatment areas of the workshop. When a production line is in fault, the operators can press any one of the buttons to cut off or stop the whole production line (with the exception of the power for the alarm system and the ventilation system).

6. The whole treatment line is designed to have an integrated alarm control system to control and process all the collected data. UPS are also provided in case of power cut to ensure the normal working of the alarm system.

7. To prevent static electricity, all devices comprising electrical control system and the ventilation system are reliably grounded.

8. When to store waste refrigerators using isobutane as the refrigerant, fences are required to surround the storage area as isobutane belongs to flammable and explosive substance. Furthermore, any source of fire shall be prohibited and measures shall be taken to prevent thunder, lightning waves and lightning induction.

9. Since waste refrigerators contain flammable and explosive gases and dust in the process of being treated, for the purpose of safety production, an auto fire alarm system and auto sprinkler system shall be installed in the disassembly/treatment workshop.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for treatment and recycling of waste refrigerators, comprising the steps of:
    a) placing a feeding device, a double shaft shredder equipped with a pressing device, a first belt conveyor, a rolling crusher, a second belt conveyor, a first vibratory feeder, a cylindrical iron remover, a second vibratory feeder, and an eddy current sorter in an enclosed workshop, equipping the workshop with a multistage ventilation system, a protective device of nitrogen, a device for spraying, dedusting, and cooling, an on-line detection and alarm control device for cyclopentane gas concentration, polyurethane dust concentration, and temperature, safety devices for static grounding, main circuit switching control, emergency stop control, alarm and status display, and air vent monitoring;
    b) manually disassembling waste refrigerators at a disassembling station in the front of a production line to recover their components: plastic parts, electrical boxes, wires, glasses, and circuit boards;
    c) recycling refrigerants from compressors using a machine for refrigerant recovery at a fluoride-extracting station in the middle of the production line;
    d) manually disassembling the compressors and condensers that are not easily to be crushed by a crusher at a disassembling station in the rear of the production line;
    e) transferring refrigerator bodies and doors to the double shaft shredder equipped with a pressing device via the feeding device for preliminary crushing, and transferring crushed materials using the first belt conveyor to the rolling crusher for secondary crushing, or directly transferring the refrigerator bodies and doors to a mixing crusher for crushing via the feeding device so that metals, plastics, and foams are completely dissociated for further separation and sorting;
    f) sorting out the crushed materials by wind force, collecting polyurethane foams using the cyclone collector, and discharging waste gases;
    g) transferring remaining materials via the second belt conveyor and separating black metallic iron using a self-discharge type iron remover made of permanent magnet;
    h) leading the materials to the cylindrical iron remover via the second belt conveyor and the first vibratory feeder in a continuous and even manner for magnetic separation of remaining iron, and collecting the iron into a skip via a hopper of the cylindrical iron remover; and
    i) collecting remaining materials into the second vibratory feeder via another hopper of the cylindrical iron remover, transferring the materials via the second vibratory feeder to the eddy current sorter in a continuous and even manner for separation of non-ferrous metals comprising cooper, aluminum, plastics, and thick polyurethane foam, and collecting the cooper, aluminum, plastics, and thick polyurethane foam into different skips.

2. A production line for treatment and recycling of waste refrigerators, comprising in sequence:
   a) a manual disassembly station;
   b) a device for refrigerant recycling;
   c) a feeding device;
   d) a double shaft shredder equipped with a pressing device;
   e) a first belt conveyor;
   f) a rolling crusher;
   g) a second belt conveyor;
   h) a first vibratory feeder;
   i) a cylindrical iron remover;
   j) a second vibratory feeder; and
   k) an eddy current sorter;
wherein
   a cyclone collector, a dust catcher, and a fan are mounted at the area of the rolling crusher or the mixing crusher;
   an input pipe of the cyclone collector is connected with flanges arranged on the top and the top of feed openings of either the rolling crusher or the mixing crusher;
   an input pipe of the dust catcher is connected with an output pipe of the cyclone collector;
   a self-discharge type iron remover made of permanent magnet is mounted closely on the second belt conveyor; and
   devices from the feeding device to the eddy current sorter are all placed in an enclosed workshop with explosion-proof and dust removal functions.

3. The production line of claim 2, wherein the double shaft shredder, the first belt conveyor, and the rolling crusher as a whole is replaced by a mixing crusher, and the cyclone collector, the dust catcher, and the fan are mounted at the area of the mixing crusher.

4. The production line of claim 2, wherein the feeding device comprises a structure as follow:
   a hopper is mounted at one side of the frame of the double shaft shredder;
   one end of an arm of the hopper is coupled to the frame of the double shaft shredder through a rotation axis;
   a central section of the arm of the hopper is connected with a rod of a hydraulic piston; and
   one end of the hydraulic cylinder is coupled to the frame of the double shaft shredder.

5. The production line of claim 2, wherein the double shaft shredder with the pressing device comprises a structure as follow:
   two hexagonal rotation axes and shredding knives mounted thereon which are separately driven by two high-power motors are mounted inside a shredding chamber on a frame of the double shaft shredder;
   a feeding hopper is mounted above the shredding chamber; and
   the top of the feeding hopper is coupled to an outlet for negative pressure dust and the pressing device is mounted on the frame at the rear of the feeding hopper.

6. The production line of claim 2, wherein the rolling crusher comprises a structure as follows:
   a motor, a driving belt, and a rotation axis are mounted under a frame of the rolling crusher;
   the frame is provided with a crushing chamber and a discharge chamber;
   the discharge chamber is under and communicates with the crushing chamber;
   stationary knives fixed by bolts are mounted at side walls of the crushing chamber;
   the rotation axis inside the crushing chamber is mounted with a cutting knife holder and a roller holder, in which the cutting knife holder is mounted with cutting knives and the roller holder is mounted with a rotary roller with teeth through an axis pin;
   the discharge chamber is under the crushing chamber;
   a discharge plate is mounted on the discharge chamber and fixed on the rotation axis; and
   the top of the crushing chamber is coupled to a feeding hopper and the top of the feeding hopper is coupled to an outlet for negative pressure dust.

7. The production line of claim 2, wherein the cylindrical iron remover comprises a structure as follows:
   a stainless roller is mounted inside a frame of the cylindrical iron remover;
   an arc-shaped permanent magnetic material, with length less than half side of an inner wall of the stainless roller, is mounted on the inner wall of the stainless roller;
   the feed side of the stainless roller is mounted along the tangent line of the top of the stainless roller; and
   a non-magnetic material outlet and a magnetic material outlet are respectively arranged at the front and back of the frame bottom.

8. The production line of claim 2, wherein the eddy current sorter comprises a structure as follows:
   a first motor and a permanent magnetic roller driven by the first motor for speedy rotation are mounted on a frame of the eddy current sorter;
   a second motor as well as a belt roller and a conveyor belt driven by the second motor are also mounted on the frame;
   the conveyor belt is positioned above the permanent magnetic roller; and
   a non-ferrous metal outlet and a non-metallic materials outlet are respectively arranged at the front and back of the frame under the end of the conveyor belt.

9. The production line of claim 2, wherein the workshop is equipped with a multistage ventilation system, a protective device of nitrogen, a device for spraying, dedusting, and cooling, an on-line detection and alarm control device for cyclopentane gas concentration, polyurethane dust concentration, and temperature, safety devices for static grounding, main circuit switching control, emergency stop control, alarm and status display, and air vent monitoring.

10. The production line of claim 3, wherein the mixing crusher comprises a structure as follows:
   a motor, a driving belt, and a rotation axis are mounted under a frame of the mixing crusher;
   a crushing chamber and a discharge chamber are mounted on the frame;
   the crushing chamber is mounted with stationary knives;
   the rotation axis inside the crushing chamber is mounted with a cutting knife holder and the cutting knife holder is mounted with cutting knives;
   the rotation axis is mounted with a rotary roller with teeth through a roller holder and an axis pin;
   the discharge chamber is under the crushing chamber;
   a discharge plate is mounted on the discharge chamber;
   a shredding chamber is provided above the crushing chamber;
   two hexagonal rotation axes and shredding knives mounted thereon which are separately driven by two high-power motors are mounted inside a shredding chamber;
   a feeding hopper is mounted on the top of the shredding chamber; and the top of the feeding hopper is coupled to an outlet for negative pressure dust.

* * * * *